United States Patent [19]

Fonser et al.

[11] Patent Number: 5,038,828

[45] Date of Patent: Aug. 13, 1991

[54] LIQUID ACCUMULATOR

[75] Inventors: Per-Åke Fonser, Stockholm; Peter H. Hagqvist, Älvsjö both of Sweden

[73] Assignee: Aktiebolaget Electrolux, Stockholm, Sweden

[21] Appl. No.: 592,510

[22] Filed: Oct. 3, 1990

[30] Foreign Application Priority Data

Oct. 9, 1989 [SE] Sweden ............................... 8903310

[51] Int. Cl.[5] ............................................ F16L 55/04

[52] U.S. Cl. ......................................... 138/30; 138/26

[58] Field of Search .................. 138/26, 30; 220/85 B; 417/540

[56] References Cited

U.S. PATENT DOCUMENTS 2,532,143 11/1950 Breit ..................................... 138/30
3,139,113 6/1964 Mercier ................................ 138/30
3,230,975 1/1966 Mercier ................................ 138/30
3,621,882 11/1971 Kupiec ................................. 138/30
3,931,834 1/1976 Caillet .................................. 138/30

*Primary Examiner*—James E. Bryant, III
*Attorney, Agent, or Firm*—Pearne, Gordon, McCoy & Granger

[57] ABSTRACT

A liquid accumulator comprises a generally cylindrical receptacle (10) having a flexible membrane (14) dividing the interior of the receptacle into a liquid chamber (15) and a gas chamber (17). The membrane comprises a hose which is open at both ends, one of which is bent inwards and conveyed through the hose and the ends of the hose are interconnected to form outer and inner membrane walls between which said liquid chamber is enclosed.

2 Claims, 1 Drawing Sheet

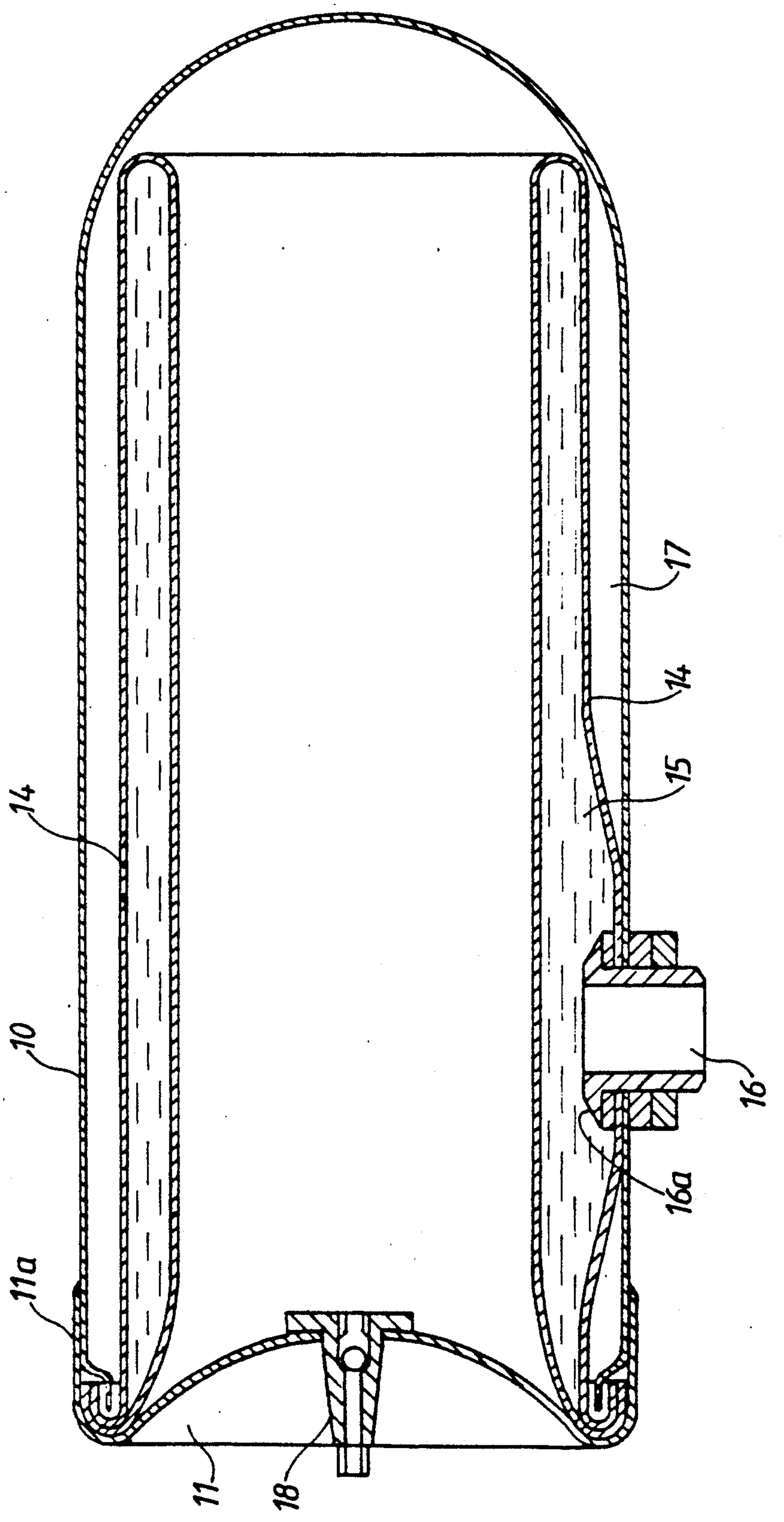
17
14
15
14
10
16
16a
11a
11
18

LIQUID ACCUMULATOR

The present invention relates to a liquid accumulator comprising a generally cylindrical receptacle and a flexible membrane dividing the interior of the receptacle into a liquid chamber and a gas chamber, said liquid chamber being completely enclosed by said membrane and adapted to be connected to a conduit via a connection provided in the wall of the receptacle.

In previously known accumulators of this kind both the chambers separated by the membrane are defined by the membrane and the inner wall of the receptacle. In case the liquid is water or any other corrosive liquid, the receptacle must either be made of a stainless material or be subjected to an anti-corrosive treatment on its inside, and the receptacle is therefore relatively expensive to manufacture. In addition, the membrane is in certain stages exposed to considerable tension. Such a liquid accumulator is disclosed in e.g. U.S. Pat. No. 2,919,718.

The object of the invention is to provide an accumulator for liquids in which the above-mentioned disadvantages of the prior art have been eliminated. This object has been achieved by means of a liquid accumulator of the kind mentioned in the introduction which according to the invention is characterized in that the membrane is formed by a hose which is open at both ends, one of said ends being bent inwards and conveyed through the hose and the ends of the hose being interconnected to form outer and inner membrane walls between which said liquid chamber is enclosed.

The invention will be described in more detail in the following with reference to the accompanying drawing which illustrates a section of a preferred embodiment of the liquid accumulator according to the invention.

The liquid accumulator shown in the drawing comprises a cylindrical receptacle 10 having an open end which is covered by an end wall 11. Inside the receptacle 10 is provided a membrane 14 formed by a rubber hose which is open at both ends, and one end has been folded inwards and conveyed through the hose to form an outer and an inner membrane wall, as can been seen in the FIGURE. Both ends of the hose are bent around the edge of the open end of the receptacle and clamped between this and the end wall 11 which has a collar 11*a* bent around the end of the receptacle. The end portions of the hose thus function as sealing members between the receptacle 10 and the end wall 11 which is attached to the receptacle by means of suitable fastening means (not shown).

The membrane 14 confines an annular chamber 15 which is intended for containing liquid and is connected by means of a tube socket 16 to a conduit (not shown). The tube socket 16 extends through an opening in the wall of the receptacle 10 and the outer wall of the membrane 14 and has an inner collar 16*a* by which the membrane is clamped against the inside of the receptacle to provide a fluid-tight connection. The remaining portion of the interior of the receptacle which is separated from the liquid chamber 15 forms a gas chamber 17 containing an enclosed amount of e.g. air, the pressure of which balancing the pressure in the liquid chamber 15. The end wall 11 is provided with a valve 18 enabling adjustment of the pressure in the chamber 17.

Owing to the fact that the liquid chamber 15 is completely enclosed by the membrane 14, the inside of the receptacle will never be in contact with the liquid but only with the enclosed gas which has no corrosive effect on the receptacle. As a consequence thereof the receptacle can be made of inexpensive steel sheet which will need no anti-corrosive treatment. As is easily realized, this results in a considerable reduction of the manufacturing cost of the liquid accumulator.

As the membrane 14 is supported on its outside by the wall of the receptacle 10, the liquid chamber 15 will mostly expand inwards when liquid is supplied. The membrane will therefore not be subjected to any essential tension.

We claim:

1. Liquid accumulator comprising a generally cylindrical receptacle (10) and a flexible membrane (14) dividing the interior of the receptacle into a liquid chamber (15) and a gas chamber (17), said liquid chamber being completely enclosed by said membrane and adapted to be connected to a conduit via a connection (16) provided in the wall of the receptacle, characterized in that the membrane (14) is formed by a hose which is open at both ends, one of said ends being bent inwards and conveyed through the hose and the ends of the hose being interconnected to form outer and inner membrane walls between which said liquid chamber is enclosed.

2. Liquid accumulator according to claim 1, characterized in that the receptacle (10) comprises an end wall (11) removably attached to the receptacle with the end portions of the hose sealingly clamped therebetween.

* * * * *